United States Patent [19]

Pascarella

[11] Patent Number: 5,505,480
[45] Date of Patent: Apr. 9, 1996

[54] CONTROLLED STABILIZER BAR ATTACHMENT APPARATUS FOR IMPROVED SUSPENSION ARTICULATION

[75] Inventor: Robert J. Pascarella, Royal Oak, Mich.

[73] Assignee: Ford Motor Company, Dearborn, Mich.

[21] Appl. No.: 357,672

[22] Filed: Mar. 3, 1995

[51] Int. Cl.⁶ .................................................. B60G 21/055
[52] U.S. Cl. ........................ 280/689; 267/188; 267/277
[58] Field of Search .................................. 280/689, 723, 280/721, 665, 664; 267/188, 190, 191, 277, 278

[56] References Cited

U.S. PATENT DOCUMENTS

| | | | |
|---|---|---|---|
| 4,066,278 | 1/1978 | Takagi | 280/710 |
| 4,206,935 | 6/1980 | Sheppard et al. | 280/723 |
| 4,369,988 | 1/1983 | Takagi | 280/689 |
| 4,641,856 | 2/1987 | Reichenbach | 280/721 |
| 4,648,620 | 3/1987 | Nuss | 280/689 |
| 4,805,929 | 2/1989 | Shibata et al. | 280/721 |
| 4,834,419 | 5/1989 | Kozaki et al. | 280/723 |
| 4,973,077 | 11/1990 | Kuwayama et al. | 280/689 |
| 5,186,486 | 2/1993 | Hynds et al. | 280/689 |
| 5,217,245 | 6/1993 | Guy | 280/689 |

FOREIGN PATENT DOCUMENTS

| | | |
|---|---|---|
| 0202842 | 7/1990 | European Pat. Off. . |
| 3705520 | 9/1988 | Germany . |

OTHER PUBLICATIONS

Drive Lines, 4–Wheel & Off–Road, Feb., 1994, p. 18.

*Primary Examiner*—Margaret A. Focarino
*Assistant Examiner*—Peter C. English
*Attorney, Agent, or Firm*—Gregory P. Brown; Roger L. May

[57] ABSTRACT

A stabilizer bar attachment apparatus (15) is disclosed for use in a motor vehicle (10) for attaching a stabilizer bar (14) to the motor vehicle. The stabilizer bar attachment apparatus operatively provides for enhanced suspension articulation when a valve spool (84) is in a first position and a predetermined suspension roll stiffness when the valve spool (84) is in a second position.

11 Claims, 1 Drawing Sheet

CONTROLLED STABILIZER BAR ATTACHMENT APPARATUS FOR IMPROVED SUSPENSION ARTICULATION

BACKGROUND OF THE INVENTION

1. Field of the Invention

This invention generally relates to suspension systems for motor vehicles. More specifically, the present invention relates to a controlled stabilizer bar attachment apparatus for allowing increased suspension articulation.

2. Disclosure Information

Torsional stabilizer bars have proven useful in vehicles for many years. Such stabilizer bars commonly incorporate a transverse torsion bar segment pivotally attached and interconnecting the vehicle frame and suspension components. Stabilizer bars generally operate to increase the roll stiffness of the vehicle and improve the steering stability of the vehicle by resisting differential movement of laterally opposed wheels relative to the vehicle frame. One example of a stabilizer bar is shown in U.S. Pat. No. 4,648,620, which is assigned to the assignee of the present invention.

For some time now, the automotive industry has been providing light trucks with the driveability characteristics of a passenger car, while maintaining the ability to deliver off-road performance. One off-road performance characteristic of a light truck is the ability of the suspension to articulate through a larger range of motion. It is desirable to have a large range of suspension articulation, since this provides improved control and traction when driving at slow speeds over large obstacles, such as rocks, ditches, logs, etc. One of the drawbacks inherent in the use of stabilizer bars on light trucks is that they trade suspension articulation for increased roll stiffness.

As the light truck suspension is forced through large displacements, the torsional resistance of the stabilizer bar prevents the suspension from attaining its maximum range of articulation. Installation of a stabilizer bar in a conventional manner on some motor vehicle suspensions reduces the available suspension articulation by up to twenty percent.

It would be desirable to provide an apparatus for attaching a stabilizer bar to a light truck suspension that would permit the suspension to articulate free of stabilizer bar resistance during large suspension articulation.

SUMMARY OF THE INVENTION

The present invention provides a controlled stabilizer bar attachment for a suspension system on a motor vehicle. In the presently preferred embodiment, the stabilizer bar attachment comprises a cylinder having upper and lower ends, the lower end of the cylinder being adapted to attach to the stabilizer bar. There is a piston slidably disposed within the cylinder and defining therein upper and lower chambers. A piston rod has a first end attached to the piston and axially extends through the upper end of the cylinder to a second end. The second end of the piston rod is adapted to attach to the motor vehicle. The cylinder also includes upper and lower ports disposed in the upper and lower chambers, respectively, adjacent to the upper and lower ends.

The stabilizer bar attachment further includes a valve having a first passage in communication with the upper port and a second passage in communication with the lower port. The valve is adjustable from a first position to a second position, where the first position is operative to allow unrestricted fluid communication between the first and second passage and the second position is operative to substantially prevent fluid communication between the first and second passage.

The stabilizer bar attachment also includes a control module for adjusting the valve from the first position for increased suspension articulation to the second position for increased suspension roll stiffness.

It is an advantage of the stabilizer bar attachment to improve control and traction of the motor vehicle during off-road maneuvers while providing enhanced roll control during steering maneuvers not heretofore achieved on motor vehicle.

Other objects, features and advantages of the present invention will become apparent to those skilled in the art from the drawings, detailed description and claims which follow.

DETAILED DESCRIPTION OF THE PREFERRED EMBODIMENTS

Figure 1:
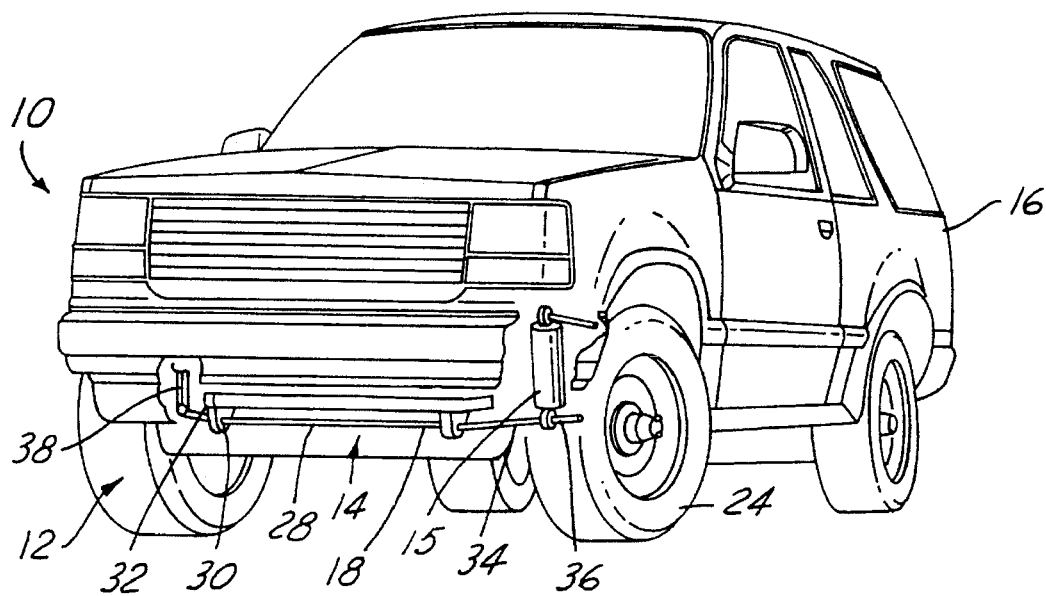
FIG. 1 is a perspective view of a motor vehicle having front suspension including a stabilizer bar according to the present invention.

Referring now to FIG. 1, a motor vehicle 10 includes a front suspension 12 and a rear suspension (not shown). The front suspension 12, as could the rear suspension, includes a stabilizer bar 14, attached using a stabilizer bar attachment apparatus 15 in accordance with the present invention. For simplicity, the following description is limited to the left side of the vehicle, it being understood that the right side is the same, except where noted. The motor vehicle illustrated in FIG. 1 includes a body structure 16 mounted to a frame 18, however, the vehicle could be constructed with a unibody structure, eliminating the necessity for the frame 18. A road wheel 24 is rotatably mounted to a spindle (not shown), which is attached to a suspension member (not shown depending pivotally from the frame 18.

The stabilizer bar 14 consists of a torsional reaction segment 28 running generally transverse to the longitudinal axis of the vehicle and is pivotally mounted to the frame 18 by a conventional elastomeric bearing 30 maintained within a bracket 32. The torsional reaction segment 28 of the stabilizer bar 14 is joined with crank arms 34 disposed at either end of segment 28. The crank arms 34 extend generally perpendicular to the torsional reaction segment 28, parallel to a longitudinal axis of the vehicle 10. The crank arms 34 in the preferred embodiment include a threaded rod portion 36 for attachment to the stabilizer bar attachment apparatus 15 of the present invention. It should be apparent to those skilled in the art that alternative forms of attachment will provide equivalent operability and functionality. The stabilizer bar attachment apparatus of the present invention may be used in combination with a conventional link 38 for attaching the opposite end of the stabilizer bar 14 to the motor vehicle 10. It is contemplated that the stabilizer bar attachment apparatus 15 could be installed on both ends of the stabilizer bar 14, however, the present invention permits the economically beneficial ability to use only one.

Figure 2:
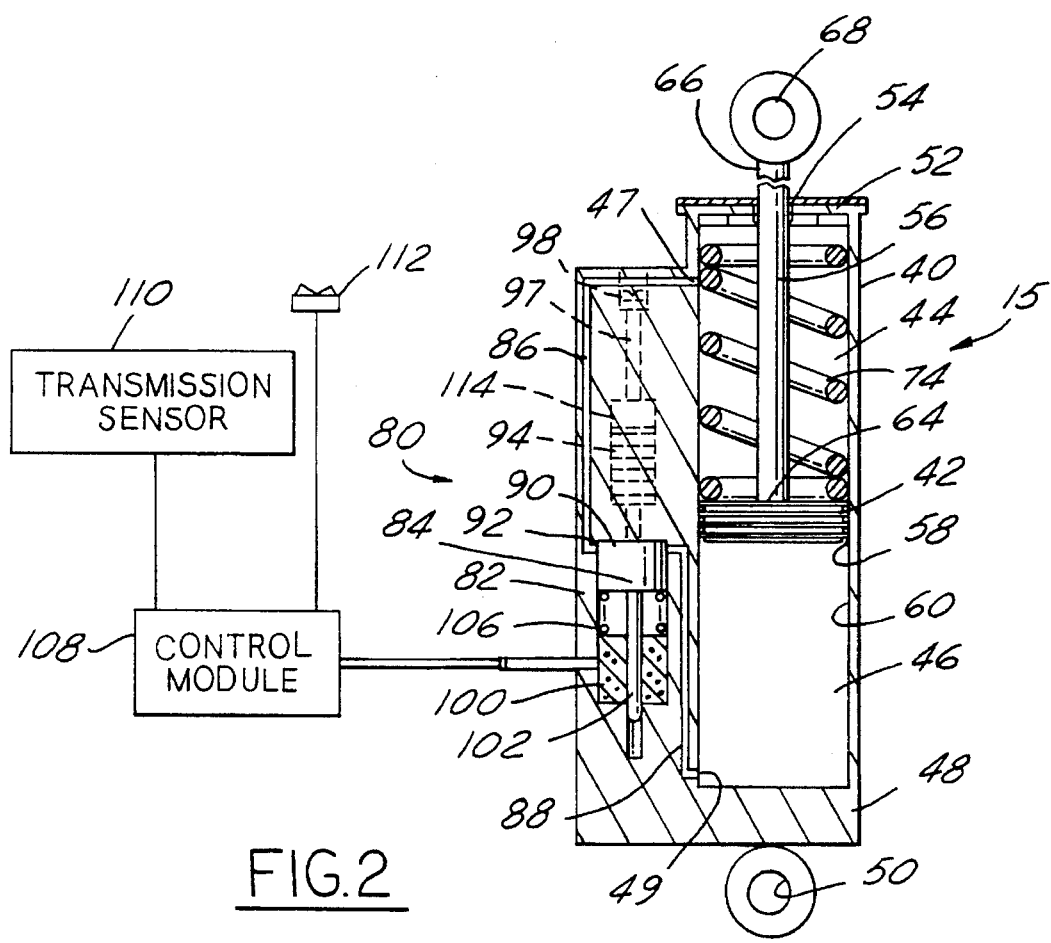
FIG. 2 is a side view, partially cut away, of a stabilizer bar attachment apparatus according to the present invention.

Referring now to FIG. 2, the stabilizer bar attachment apparatus 15 includes a cylinder 40 in which there is a slidably disposed piston 42 that divides the interior space of the cylinder into upper and lower chambers 44, 46. The upper chamber 44 includes an upper port 47 adjacent to an upper end 52 for communicating fluid in and out of the upper chamber 44. Similarly, the lower chamber 46 includes a lower port 49 adjacent to a lower end 48 for communicating fluid in and out of the lower chamber 46. The lower end 48 includes an aperture 50 for attachment to a threaded rod portion 36 of the stabilizer bar 14. The upper end 52 includes a sealed aperture 54 for slidably receiving a piston rod 56 therethrough.

The piston 42 includes a seal 58 on an outer circumference of the piston 42, providing a sealing contact between the piston 42 and an internal bore 60 of the cylinder 40. The piston securely attaches to a first end 64 of the piston rod 56. The piston rod 56 extends through the upper end 52 of the cylinder 40 to a second end 66, which includes an aperture 68 for receiving a threaded rod fastener (not shown) therethrough for attachment to the motor vehicle 10.

The stabilizer bar attachment apparatus 15 illustrated in FIG. 2 includes a piston biasing spring 74 disposed coaxially about the piston rod between the upper end 52 of the cylinder 40 and the piston 42. Alternatively, the piston biasing spring 74 could be coaxially disposed external to the cylinder 40, between the second end 66 of the piston rod 56 and the upper end 52 of the cylinder 40. In yet another alternative, the piston biasing spring 74 could be coaxially disposed within the lower chamber 46 of the cylinder 40, between the piston 42 and the lower end 48 of the cylinder 40.

Also shown in FIG. 2, the stabilizer bar attachment apparatus 15 further includes a valve 80 having a valve sleeve 82 and a valve spool 84 disposed therein. The valve sleeve 82 includes a first passage 86 in communication with the upper port 47 and a second passage 88 in communication with the lower port 49. The first and second passages 86, 88 open into a valve chamber 90. The valve spool 84 includes a circumferential shoulder 92 disposed in the valve chamber 90, adjacent to the first and second passages 86, 88.

The valve sleeve 82 of the illustrated embodiment also includes an expansion chamber 94 in communication with the valve chamber 90. The volume of the expansion chamber 94 is proportionally related to the volume of the piston rod 56 that extends within the cylinder 40. The expansion chamber 94 includes a third passage 97 extending upward to a bleed screw 98, which opens to the environment surrounding the valve 80.

The valve also includes a solenoid 100 that surrounds a solenoid armature 102 extending from the valve spool 84. A valve biasing spring 106 is coaxially disposed about the solenoid armature 102, adjacent to the solenoid 100. The solenoid 100 is operatively connected to a control module 108 which provides a valve control signal.

The control module 108 includes a microprocessor and may be arranged according to a number of different architectures. Those skilled in the art will appreciate, in view of this disclosure, that each such architecture could generally include an input-output control circuit (I/O) for exchanging data with external devices and a random access memory (RAM) for temporarily holding data while the data are being processed. Control programs including unit commands will be sequentially read from a read-only memory (ROM). Unit commands will be executed by a central processing unit (CPU).

The control module 108 determines whether a drive train transmission is operating in a low gear range, such as low range associated with a transfer case in a four wheel drive vehicle, from a transmission signal generated by a transmission sensor 110 and generates a valve control signal corresponding to this. The control module may also obtain input from a driver operated switch 112 for selectively deactivating the solenoid 100.

Operation of a stabilizer bar attachment apparatus according to the embodiment represented in FIGS. 1 and 2 will now be described. When the control module 108 receives a transmission signal from the transmission sensor 110 indicating operation in low gear range, and the operator has not deactivated the system using switch 112, a valve control signal is sent to the solenoid 100.

The valve control signal may be in the form of a square wave signal having a predetermined pulse width and magnitude sufficient to overcome the valve biasing spring 106. When the windings of the solenoid 100 are energized, valve spool 84 moves toward the solenoid 100 to a first position, thereby unblocking the first and second passages 86, 88, thus permitting fluid flow through the valve chamber 90. With the solenoid 100 energized, as the vehicle suspension articulates, the piston 42 moves up and down in the cylinder 40 displacing fluid from the upper chamber 44 into the lower chamber 46 and vice versa.

Specifically, in the embodiment shown, the valve 80 includes the expansion chamber 94 for compensating for the volume of the piston rod 56. As the piston enters the lower chamber 46, fluid displaced from the lower chamber 46 exceeds the volume available in the upper chamber 44 due to the volume of the piston rod 56. The expansion chamber 94 has sufficient volume to accept the additional fluid from the lower chamber 46. There is a predetermined amount of compressible gas 114, such as air, in the expansion chamber 94 to permit this without providing significant resistance to movement of the piston 42. Similarly, as the piston enters the upper chamber 44, the fluid drawn into the lower chamber 46 exceeds that displaced from the upper chamber 44, and the piston rod volume difference is made up by the fluid in the expansion chamber 94. Thus the suspension is permitted to undergo maximum unrestricted articulation allowing for enhanced control and traction under low gear conditions.

When the control module 108 receives a transmission signal from the transmission sensor 110 indicating operation out of low gear range, or the operator has deactivated the system using switch 112, or there is a loss of power to the control module 108, the valve biasing spring 106 forces the valve spool 84 into a second position, away from the solenoid 100 to block the flow of fluid from the first and second passages 86, 88 through the valve chamber 90. This hydraulically locks the piston 42 within the cylinder 40.

With the valve in the second position, the piston rod 56 and cylinder 40 transfer suspension loads through the stabilizer bar. The stabilizer bar can perform its desired effect of reducing vehicle roll by increasing the roll stiffness of the vehicle suspension.

While it has been determined that the present invention works satisfactorily with the piston locked in any position within the cylinder, it has also been observed that it is advantageous to have the stabilizer bar 14 in equilibrium when the vehicle is not subjected to any roll inducing lateral acceleration. Assuming the neutral position for the piston is midway between the upper and lower chambers 44, 46, the piston biasing spring 74 applies a restoring force against the piston 42 to return it to the neutral position. The equilibrium forces within the stabilizer bar 14 compliment the biasing spring 74 force in this regard. In order for the piston to return to the neutral position, the piston seal 58 is slightly undersized to permit a slight flow of fluid between the upper and lower chambers 44, 46. However, this flow rate is inconsequential when compared to the flow rate between the first and second passages when the valve spool 84 is in the first position. Due to this minimal flow rate, it takes considerable time for the piston to return to the neutral position.

Various other modifications and permutations of the present invention, no doubt, will occur to those skilled in the art. For instance, those skilled in the art will appreciate, in view of this disclosure, that although a steerable, front suspension is illustrated in FIG. 1, a stabilizer bar attachment apparatus according to the present invention may be used on many varieties of suspensions. For example, on a solid live axle, non-steerable rear suspension the torsional reaction segment of the stabilizer bar may be attached to the axle by a bracket and the end of the stabilizer bar attached as described above. Therefore, it is the following claims, including all equivalents, which define the scope of the present invention.

I claim:

1. A stabilizer bar attachment apparatus for use in attaching a stabilizer bar to a motor vehicle suspension, said stabilizer bar attachment apparatus comprising:

a cylinder having upper and lower ends, said lower end of said cylinder being adapted to attach to said stabilizer bar;

a piston slidably disposed within said cylinder and defining therein upper and lower chambers;

a piston rod having a first end attached to said piston and axially extending through said upper end of said cylinder to a second end being adapted to attach to said motor vehicle;

a seal interposed between said piston and said cylinder, said seal being adapted to permit a predetermined amount of fluid flow sufficient to permit the stabilizer bar to achieve a neutral position after said vehicle has been stationary for a predetermined amount of time;

upper and lower ports disposed in said upper and lower chambers, respectively, adjacent to said upper and lower ends;

a valve having a first passage in communication with said upper port and a second passage in communication with said lower port, said valve being adjustable from a first position to a second position, said first position being operative to allow unrestricted fluid communication between said first and second passage and said second position being operative to substantially prevent fluid communication between said first and second passage; and control means for adjusting said valve from said first position for increased suspension articulation to said second position for increased suspension roll stiffness.

2. An attachment apparatus according to claim 1, wherein said valve further comprises:

a valve sleeve and a valve spool slidably disposed therein, said valve spool includes a shoulder adapted to sealingly engage said first and second passages in said valve sleeve;

a valve chamber disposed in said valve sleeve and fluidly interconnecting said first and second passages when said valve is in said first position.

3. An attachment apparatus according to claim 2, wherein said valve further comprises an expansion chamber in communication with said valve chamber, said expansion chamber having a predetermined volume sufficient to provide a volumetric fluid balance between said first and second chambers in accordance with the volume of said piston rod.

4. An attachment apparatus according to claim 2, wherein said valve further comprises:

a valve biasing spring disposed between said valve sleeve and said valve spool; and a solenoid surrounding a solenoid armature attached to said valve spool, said solenoid being operative to overcome said valve biasing spring, thereby adjusting from said second position to said first position.

5. An attachment apparatus according to claim 1, further comprises a piston biasing spring disposed between said piston rod and said cylinder, said piston biasing spring being adapted to urge said piston into neutral position within said cylinder.

6. An attachment apparatus according to claim 1, wherein said control means further comprises:

a transmission signal representing operation of said vehicle in a low gear range; and a control module for adjusting said valve from said first position to said second position whenever said transmission signal does not indicate operation of said motor vehicle in said low gear range.

7. A stabilizer bar attachment apparatus for use in attaching a stabilizer bar to a motor vehicle suspension, said stabilizer bar attachment apparatus comprising:

a cylinder having upper and lower ends, said lower end of said cylinder being adapted to attach to said stabilizer bar;

a piston slidably disposed within said cylinder and defining therein upper and lower chambers;

a piston rod having a first end attached to said piston and axially extending through said upper end of said cylinder to a second end being adapted to attach to said motor vehicle;

a seal interposed between said piston and said cylinder, said seal being adapted to permit a predetermined amount of fluid flow sufficient to permit the stabilizer bar to achieve a neutral position after said vehicle has been stationary for a predetermined amount of time;

upper and lower ports disposed in said upper and lower chambers, respectively, adjacent to said upper and lower ends;

a valve in fluid communication with said upper and lower ports, said valve being operative to control the fluid between said upper and lower chambers; and a transmission signal having a positive state when said vehicle is operated in a low gear range and a negative state when said vehicle is operated in any other gear range; and a control means for adjusting said valve between a first position and a second position responsive to said transmission signal, whereby said valve is adjusted to said first position when said transmission signal is positive to provide increased suspension articulation and to said second position when said transmission signal is negative to provide increased suspension roll stiffness.

8. An attachment apparatus according to claim 7, wherein said valve further comprises a first passage in communication with said upper port and a second passage in communication with said lower port, said first position being operative to allow unrestricted fluid communication between said first and second passage and said second position being operative to substantially prevent fluid communication between said first and second passage.

9. An attachment apparatus according to claim 8, wherein said valve further comprises:

a valve sleeve and a valve spool slidably disposed therein, said valve spool includes a shoulder adapted to sealingly engage said first and second passages in said valve sleeve;

a valve chamber disposed in said valve sleeve and fluidly interconnecting said first and second passages when said valve is in said first position.

10. An attachment apparatus according to claim 9, wherein said valve further comprises an expansion chamber in communication with said valve chamber, said expansion chamber having a predetermined volume sufficient to provide a volumetric fluid balance between said first and second chambers in accordance with the volume of said piston rod.

11. An attachment apparatus according to claim 9, wherein said valve further comprises:

a valve biasing spring disposed between said valve sleeve and said valve spool; and a solenoid surrounding a solenoid armature attached to said valve spool, said solenoid being operative to overcome said valve biasing spring, thereby adjusting from said second position to said first position.

* * * * *